Patent Number: 5,042,837
Date of Patent: Aug. 27, 1991

Kleinschmit et al.

[54] REAR AXLE SUPPORT FOR PASSENGER VEHICLE

[75] Inventors: Einhard Kleinschmit; Peter Tattermusch, both of Esslingen; Werner König, Stuttgart, all of Fed. Rep. of Germany

[73] Assignee: Daimler-Benz Aktiengesellschaft, Stuttgart, Fed. Rep. of Germany

[21] Appl. No.: 508,288

[22] Filed: Apr. 13, 1990

[30] Foreign Application Priority Data

Apr. 17, 1989 [DE] Fed. Rep. of Germany ....... 3912501

[51] Int. Cl.⁵ ............................................. B62D 21/15
[52] U.S. Cl. .................................... 280/784; 180/360; 180/378
[58] Field of Search ................ 280/784, 781; 180/360, 180/378

[56] References Cited

U.S. PATENT DOCUMENTS 2,417,214  3/1947  Roos ..................................... 180/360
2,806,543  9/1957  Nallinger ............................. 180/360

FOREIGN PATENT DOCUMENTS 85719  4/1987  Japan .................................... 180/378

Primary Examiner—Charles A. Marmor
Assistant Examiner—Karin Tyson
Attorney, Agent, or Firm—Evenson, Wands, Edwards, Lenahan & McKeown

[57] ABSTRACT

Two side pieces, each assigned to one longitudinal side of the vehicle, of rear axle supports for passenger vehicles are customarily connected to one another by two transverse tie bars arranged at a distance from one another. In a known type of vehicle, the rearward transverse tie bar, which is designed to be flexible, as seen in the direction of travel, is provided in front of a body cross-member which is directly adjacent to a spare wheel pan, near the rear crumple zone of the body at the floor. In the case of a crash, the spare wheel strikes the rearward transverse tie bar via the spare wheel pan. To increase this crumple zone in the body floor region, the rearward transverse tie bar is provided with lateral clearance between the body cross-member and the spare wheel pan. The body cross-member can thus be arranged at a correspondingly large distance from the spare wheel pan, and a corresponding free path for the spare wheel can be achieved. The profile of the rearward transverse tie bar, which is flexible in the longitudinal direction of the vehicle, will not form a stop unfavorably influencing the desired deformation in the rearward floor region.

2 Claims, 2 Drawing Sheets

REAR AXLE SUPPORT FOR PASSENGER VEHICLE

BACKGROUND AND SUMMARY OF THE INVENTION

The present invention relates to a passenger vehicle with longitudinal numbers arranged it its floor region, a spare wheel pan in the rear floor region, a cross member situated in front of the spare wheel pan and a rear axle support. More particularly, the present invention relates to a passenger vehicle in which the foregoing components are connected to one another by two transverse tie bars which are situated at a distance from each other and from the fixing points.

Passenger vehicles of this general design are exemplified by the Mercedes-Benz Model 190. The rearward transverse tie bar of the rear axle support is situated in front, as viewed in the longitudinal direction of the vehicle, of the body cross-member arranged immediately in front of the spare wheel pan. Side pieces of the rear axle support are supported by their rearward ends on the body cross-member.

The distance of the rear cross-member from the rear of the vehicle is sufficiently short to guarantee adequate transverse stability of the rearward, soft floor region, which is loaded by the spare wheel pan and is also sufficiently large to ensure an adequately long crumple zone in the event of a rear impact. Nevertheless, the cross-member in this arrangement deforms undesirably in relatively severe rear-end collisions.

It is, therefore, an object of the present invention to lengthen this crumple zone while retaining an adequate transverse reinforcement for the deformable floor region situated behind the cross-member.

The foregoing object has been achieved in accordance with the present invention by arranging the rearward transverse tie bar of the rear axle support with clearance between the body cross-member and the spare wheel pan, and also supporting the side pieces of the rear axle support at their rearward end on respective longitudinal members of the body.

In this presently contemplated embodiment, the body cross-member is provide sufficiently far in front of the spare wheel pan that a free path considerably enlarging the crumple zone is created for the spare wheel in the direction of travel or longitudinal direction of the vehicle. Due to its flexible profile in the longitudinal direction of the vehicle, the rearward transverse tie bar of the rear axle support, which is situated in this deformation zone, does not significantly impair the deformability of the crumple zone, despite its position between the spare wheel pan and the body cross-member.

A certain amount of transverse reinforcement of the rear region is simultaneously achieved via the rear axle support in conjunction with the fixing of the rearward ends of the side pieces on the longitudinal members of the body in the region behind the transverse bar, the more so since the transverse tie bar of the rear axle support is located a relatively long way rearwardly in the vehicle longitudinal direction. By virtue of the location of the fixing points for the side pieces, it is also possible to give the fixing points greater overall length which results in a wide support base with low loads on the body in the region of the respective fixing points. This arrangement is particularly advantageous as regards noise, because the rearward fixing points of the side pieces on the body favorably influence the vibrational behavior of the rearward body region.

BRIEF DESCRIPTION OF THE DRAWINGS

These and other objects, features and advantages of the present invention will become more apparent from the following detailed description of a presently preferred embodiment when taken in conjunction with the accompanying schematic drawings wherein.

DETAILED DESCRIPTION OF THE DRAWINGS

Figure 1:
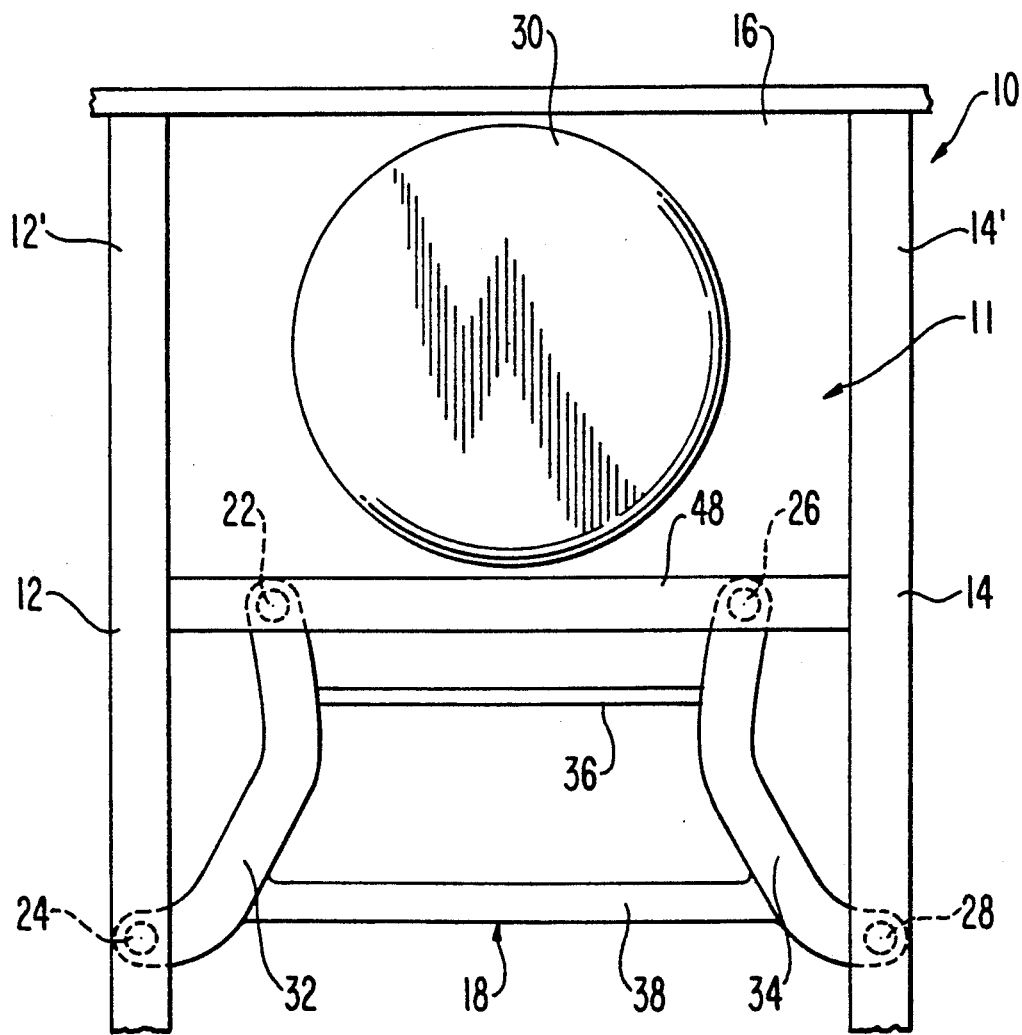
FIG. 1 is a plan view of the rearward part of a body platform of a conventional type of passenger vehicle.

Referring to FIG. 1, a body platform 11 of a known type of passenger vehicle includes a rear portion designated generally by the numeral 10 and is schematically shown to serve for a better understanding of the present invention. The body platform 11 has two longitudinal members 12, 14 constituting laterally boundaries, and a body floor 16. A rear axle support designated generally by the number 18 is supported resiliently on an underside of the body platform 11 supporting bearings 22, 24, 26, 28. As viewed in the direction of vehicle forward travel, the forward supporting bearings 24, 28 are secured on the longitudinal members 12, 14, and the rearward supporting bearings 22, 26 are secured on a body cross-member 48 extending between the longitudinal members 12, 14.

Figure 2:
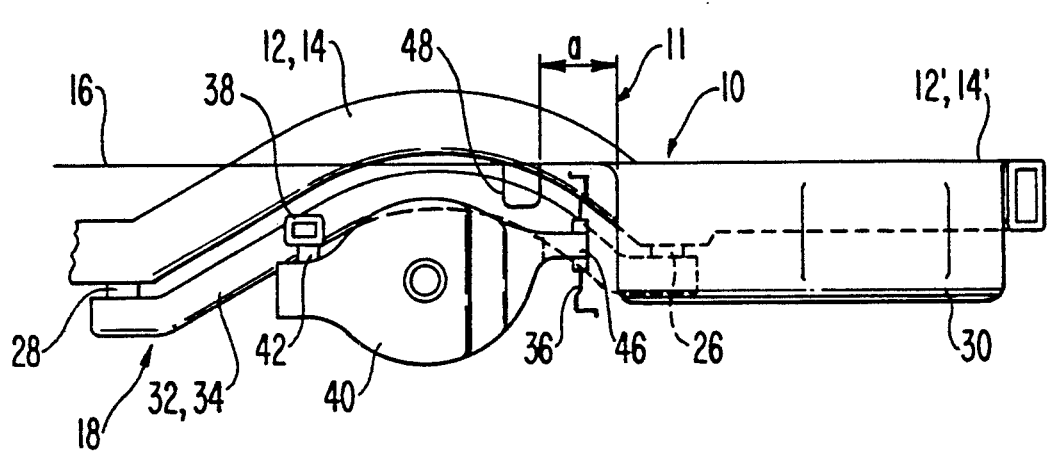
FIG. 2 is an elevational section taken along line II—II of hereinafter described FIG. 3 through the rearward portion of a body platform of a passenger vehicle to illustrate the arrangement of a rear axle support according to the present invention.

In the region of the rear axle support 18, the longitudinal members 12, 14 curve in a bridge-shape, as shown in FIG. 2, with their rearward most end pieces 12', 14' again extending approximately horizontally.

A spare wheel pan 30 is provided on the floor 16 between body cross-member 48 and the rear end of the body platform 11.

The rear axle support 18 has two side pieces 32, 34, with each piece assigned to one longitudinal side of the vehicle. The pieces 32, 34 are connected to each other by two spaced transverse tie bars 36, 38. The side pieces 32, 34 are, in the illustrated embodiment, curved arcuately in two directions, namely running inwards in the transverse direction of the vehicle and, in side view, running approximately parallel to the arcuate portions of the longitudinal members 12, 14 as seen in FIG. 2.

When a crash occurs, the spare wheel in the pan 30 strikes the body cross-member 48 in the conventional arrangement, and this may cause deformation of the cross-member 48.

In contrast to the conventional arrangement, FIG. 2 also shows the present invention. The difference in construction between the conventional arrangement and the present invention primarily resides in the fact that the rigidly designed body cross-member 48 shown in FIG. 2 extending across the rearward part of the rear axle support 18 is provided at a relatively greater distance a in front of the spare wheel pan 30, and the transverse tie bar 36 is fitted approximately midway of this distance a between the body cross-member 48 and the spare wheel pan 30. The transverse tie bar 36 can be a profiled sheet-metal element, as can other elements, and arranged between the side pieces 32, 34 of the rear axle support 18 in such a way that it is flexible in the travel direction F.

Figure 3:
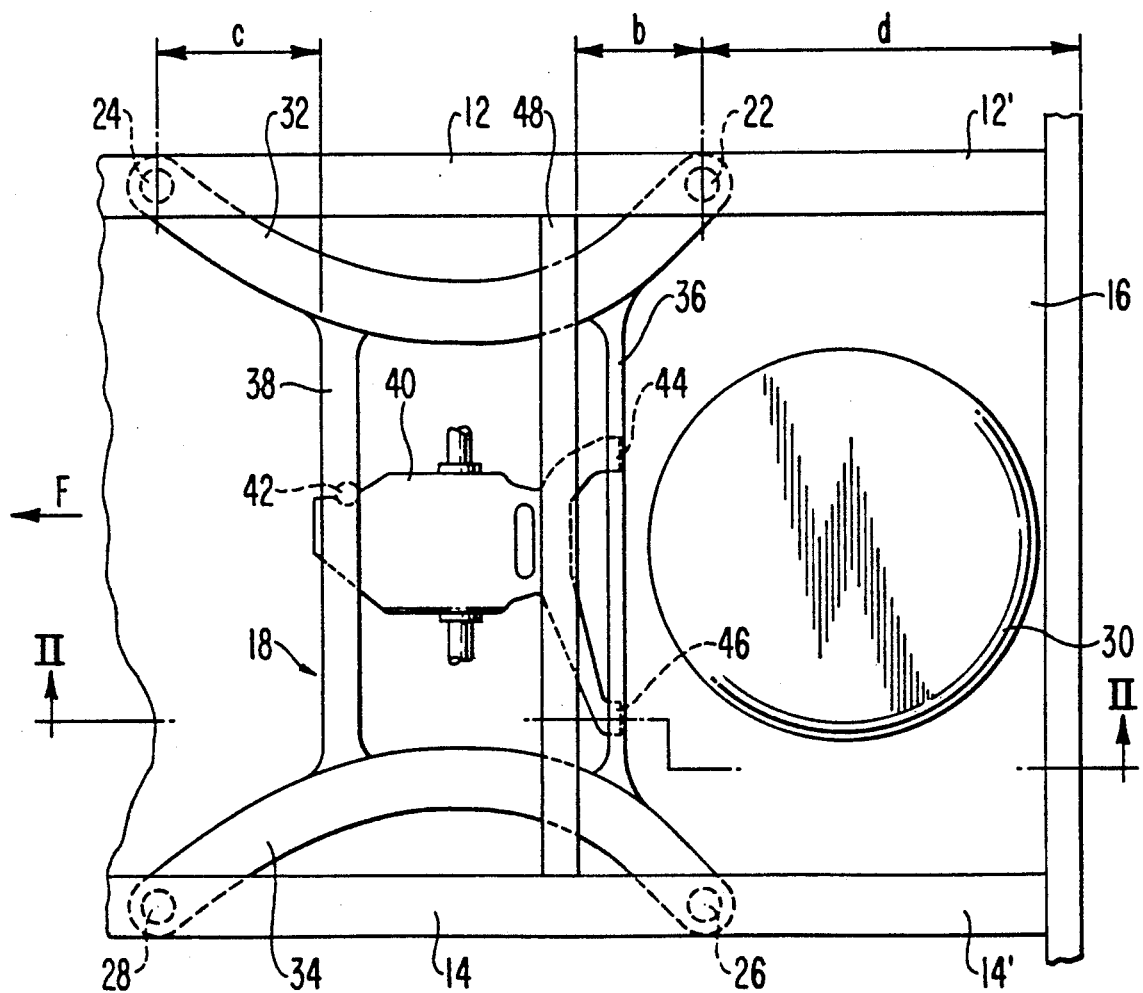
FIG. 3 is a plan view of the body platform portion shown in section in FIG. 2.

The rearward supporting bearings 22, 26 of the rear axle support 18 are also secured at the underside of the longitudinal members 12, 14 as shown in FIG. 2. The rearward supporting bearings 22, 26 are situated, as shown in FIG. 3, at a distance b from the body cross-member 48 towards the vehicle rear, and the forward supporting bearings 24, 28 are situated at a distance c in front of the forward transverse tie bar 38, which distance c is greater than the distance b. The rear axle support 18 has, at the longitudinal members, correspondingly large supporting bases.

The rear axle supported by the rear axle support 18 is driveable, for example, via an axle gear unit 40 which is supported in a known vibrationally decoupled manner on the two transverse tie bars 36, 38, i.e. at one point 42 on the forward transverse tie bar 38 (as seen in the travel direction F) and at two points 44, 46 on the rearward transverse tie bar 36.

In the case of a rear end collision, the body platform 11 of the present invention can additionally deform approximately by a distance defined by the distance in the travel direction F. The rearward transverse tie bar 36 with its flexibility in the travel direction F and the resilient support of the axle gear unit 40 on the transverse tie bar 38 offer no significant resistance to this deformation path which enlarges the rear crumple zone of the vehicle. The spare wheel acting on the transverse tie bar 36 via the wall of the spare wheel pan 30 in the case of a crash is prevents from simultaneously occasioning a deformation of the body cross-member.

In addition to the additional free path distance a achieved from the spare wheel, the placement of the body cross-member 48 makes reinforcement of the rear axle support 18 in the transverse direction of the vehicle possible where the support 18 is particularly vulnerable to the influence of laterally acting deformation forces.

Furthermore, the distance d of the rearward supporting bearings 22, 26 of the side pieces 32, 34 from the vehicle rear is considerably less than that of the body cross-member 48 from the vehicle rear. The sides pieces 32, 34 thus contribute to a considerably greater transverse reinforcement of the rear region of the vehicle, so as to damp vibrations in the rear region and achieve correspondingly lower-noise driving comfort.

While a presently preferred embodiment has been shown as described, it should be understood that the same will now be susceptible to changes and modifications to one skilled in the art given the details disclosed herein. Therefore, it is not intended that the present invention be limited necessarily to what has been shown and described but rather that the invention be construed as defined in the appended claims.

What is claimed:

1. Passenger vehicle, comprising a body with longitudinal member arranged in a floor region at longitudinal sides of the vehicle, a spare wheel pan arranged in a rear area of the floor region, a cross-member forward of the pan, as viewed in a direction of vehicle travel, and extending between the longitudinal members, and a rear axle support having two side pieces extending in a longitudinal direction of the vehicle and secured relative to the vehicle body in their end regions and rearward and forward spaced transverse tie bars connecting the side pieces and located at a distance from points where the side pieces are fixed relative to the body, wherein the rearward tie bar is flexible in the longitudinal direction of the vehicle, and is arranged between the cross-member and the spare wheel pan with a clearance therebetween, the cross-member is situated between the rearward and forward tie bars and the side pieces are supported at one of their ends at a respective one of the longitudinal members.

2. The passenger vehicle according to claim 1, wherein the side pieces extend a greater distance beyond the transverse tie bar situated more forward in the direction of vehicle travel than a distance the side pieces extend beyond the other transverse tie bar.

* * * * *